US011915458B1

(12) United States Patent
Tissera et al.

(10) Patent No.: US 11,915,458 B1
(45) Date of Patent: Feb. 27, 2024

(54) SYSTEM AND PROCESS FOR REDUCING TIME OF TRANSMISSION FOR SINGLE-BAND, MULTIPLE-BAND OR HYPERSPECTRAL IMAGERY USING MACHINE LEARNING BASED COMPRESSION

(71) Applicants: Migel Dileepa Tissera, Coquitlam (CA); Francis George Doumet, Vancouver (CA)

(72) Inventors: Migel Dileepa Tissera, Coquitlam (CA); Francis George Doumet, Vancouver (CA)

( * ) Notice: Subject to any disclaimer, the term of this patent is extended or adjusted under 35 U.S.C. 154(b) by 115 days.

(21) Appl. No.: 17/735,972

(22) Filed: May 3, 2022

Related U.S. Application Data (63) Continuation of application No. 16/781,840, filed on Feb. 4, 2020, now Pat. No. 11,386,582.

(60) Provisional application No. 62/801,992, filed on Feb. 6, 2019.

(51) Int. Cl.
*G06T 9/00* (2006.01)
*G06T 3/40* (2006.01)

(52) U.S. Cl.
CPC ............ *G06T 9/002* (2013.01); *G06T 3/4046* (2013.01)

(58) Field of Classification Search
CPC .................................................... G06T 3/4046
USPC ......................................................... 382/157
See application file for complete search history.

(56) References Cited

U.S. PATENT DOCUMENTS

2016/0035078 A1* 2/2016 Lin ..................... G06V 10/772
382/157
2020/0126185 A1* 4/2020 Choi ....................... G06N 3/02

OTHER PUBLICATIONS

Han "An Unsupervised Algorithm for Change Detection in Hyperspectral Remote Sensing Data Using Synthetically Fused Images and Derivative Spectral Profiles" Hindawi Journal of Sensors 2017 (Year: 2017).*

* cited by examiner

*Primary Examiner* — Mark Roz
(74) *Attorney, Agent, or Firm* — Plager Schack LLP; Mark H. Plager; Stephen Hallberg (57) ABSTRACT

A process for reducing time of transmission for single-band, multiple-band or hyperspectral imagery using Machine Learning based compression is disclosed. The process uses Machine Learning to compress single-band, multiple-band and hyperspectral imagery, thereby decreasing the needed bandwidth and storage-capacity requirements for efficient transmission and data storage. The reduced file size for transmission accelerate the communications and reduces the transmission time. This enhances communications systems where there is a greater need for on or near real-time transmission, such as mission critical applications in national security, aerospace and natural resources.

13 Claims, 5 Drawing Sheets

SYSTEM AND PROCESS FOR REDUCING TIME OF TRANSMISSION FOR SINGLE-BAND, MULTIPLE-BAND OR HYPERSPECTRAL IMAGERY USING MACHINE LEARNING BASED COMPRESSION

CLAIM OF BENEFIT TO PRIOR APPLICATIONS

This application is a continuation of and claims benefit to U.S. Non-Provisional patent application Ser. No. 16/781,840, entitled "SYSTEM AND PROCESS FOR REDUCING TIME OF TRANSMISSION FOR SINGLE-BAND, MULTIPLE-BAND OR HYPERSPECTRAL IMAGERY USING MACHINE LEARNING BASED COMPRESSION," filed Feb. 4, 2020. The U.S. Non-Provisional patent application Ser. No. 16/781,840 is incorporated herein by reference.

BACKGROUND

Embodiments of the invention described in this specification relate generally to image compression and decompression, and more particularly, to a machine learning-based media compression and decompression system that reduces time of transmission of single-band, multiple-band, and hyperspectral imagery and a machine learning-based media compression and decompression process for reducing time of transmission of single-band, multiple-band, and hyperspectral imagery using machine learning based compression.

New media types such as ultra-high resolution audio, video, single or multiple-band images, and hyperspectral imagery are significantly increasing the need for available bandwidth for transmission and computer data storage. Adding to this, the available global internet bandwidth (the free capacity of the total internet bandwidth, whether through public or private networks, at any given time) is not increasing at the same rate as the above mentioned media content being produced. Although existing bandwidth is sufficiently available to handle present media file transmissions, the problem becomes apparent when extrapolating these trends of increasing file sizes and increasing bandwidth needs over time. It is conceivable and even likely that these ever increasing file sizes and bandwidth needs will significantly slow down the transmission process, resulting in increased time for transmission, rendering a feeling of a slower internet.

The existing conventional systems that are employed to address bandwidth/file transmission size issues include legacy signal processing methods to compress spatial imagery. Specifically, numerous traditional image compression schemes have existed over this history of capturing digital imagery. For example, digital cameras typically utilize the JPEG compression scheme to reduce the sizes of captured images and to efficiently utilize the limited storage available on the device. These traditional compression schemes, systems, and/or algorithms use legacy signal processing methods to compress such imagery, which are not sufficient to meet the ever-growing bandwidth requirements of new (and continuously newer) media types.

Therefore, what is needed is a way to effectively compress new media files for transmission and data storage in ways that decrease transmission times and increase the efficiency of the overall downstream processes associated with consuming them.

BRIEF DESCRIPTION

Some embodiments of the invention include a novel machine learning-based media compression and decompression system that reduces time of transmission of single-band, multiple-band, and hyperspectral imagery and a novel machine learning-based media compression and decompression process for reducing time of transmission of single-band, multiple-band, and hyperspectral imagery using machine learning based compression. In some embodiments, the machine learning-based media compression and decompression system and process employ efficient compression algorithms to effectively compress single-band, multiple-band, and hyperspectral imagery and other media files for transmission and data storage.

In some embodiments, the machine learning-based media compression and decompression process includes an image compression process. In some embodiments, the image compression process includes a plurality of image compression steps comprising (i) pre-processing a media file with an image by a pre-processing module, (ii) reducing spatial dimensionality of the image in the media file by an encoder module passing the media file through an encoder neural network, (iii) creating a bit string by passing the media file with the reduced spatial dimensionality image through an entropy module, and (iv) using the bit string created by the entropy module as a compressed file version of the media file.

In some embodiments, the machine learning-based media compression and decompression process includes an image decompression process. In some embodiments, the image decompression process includes a plurality of image decompression steps comprising (i) decomposing a bit string of a compressed image file by a decomposing module, (ii) reproducing an original media file by a decoder module passing the decomposed bit string through a decoder neural network, (iii) saving the reproduced media file as an image file in a particular image format by way of a particular image container algorithm associated with the particular image format, and (iv) making the image file available for use in the particular image format.

In some embodiments, the machine learning-based media compression and decompression system and process compress single-band, multiple-band, and hyperspectral imagery and other media files in ways that result in reduced file sizes in comparison with existing legacy compression systems, thereby enhancing communications systems where there is a greater need for real-time or near real-time transmission, such as mission critical applications in national security, aerospace and natural resources.

In some embodiments, the machine learning-based media compression and decompression system and process use artificial intelligence (AI) to compress/decompress image media files (whether single-band, multiple-band, or hyperspectral imagery), thereby decreasing the amount of storage needed to persist the compressed files and the amount of available bandwidth needed to transmit the compressed files. As a result, web page and other online resource load times are accelerated.

In some embodiments, the machine learning-based media compression and decompression system and process also reproduces compressed files in conventional formats (or containers) so that the receiver has the ability to view the file without additional software requirements. For example, one common type of container file is JPEG, which is an image format supported by the vast majority of web browsers and computing devices, and the machine learning-based media compression and decompression system and process are able to re-encode to such JPEG files and display the contents of the re-encoded JPEG files without any additional steps.

In some embodiments, the machine learning-based media compression and decompression system and process is able to compress images of arbitrary bit-depths, such as 8-bit or 16-bit per pixel per channel. Thus, the machine learning-based media compression and decompression system and process is generally able to be used in a variety of applications including hyperspectral imagery.

In some embodiments, the machine learning-based media compression and decompression system and process treat each image media file as a unique file. By treating each image media file as a unique file, the machine learning-based media compression and decompression system and process automatically tailor the compression algorithm based on the learned parameters (artificial intelligence/deep neural network/machine learning based learned parameters) to every single file being compressed, so that the compression factor for each individual file is maximized.

In some embodiments, the machine learning-based media compression and decompression system and process is executed (in parallel) on GPU hardware, utilizing the parallel computations it supports, thereby offering immense computational speedups.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel machine learning-based media compression and decompression system that reduces time of transmission of single-band, multiple-band, and hyperspectral imagery and a novel machine learning-based media compression and decompression process for reducing time of transmission of single-band, multiple-band, and hyperspectral imagery using machine learning based compression. In some embodiments, the machine learning-based media compression and decompression system and process employ efficient compression algorithms to effectively compress single-band, multiple-band, and hyperspectral imagery and other media files for transmission and data storage.

In some embodiments, the machine learning-based media compression and decompression process includes an image compression process. In some embodiments, the image compression process includes a plurality of image compression steps comprising (i) pre-processing a media file with an image by a pre-processing module, (ii) reducing spatial dimensionality of the image in the media file by an encoder module passing the media file through an encoder neural network, (iii) creating a bit string by passing the media file with the reduced spatial dimensionality image through an entropy module, and (iv) using the bit string created by the entropy module as a compressed file version of the media file.

In some embodiments, the machine learning-based media compression and decompression process includes an image decompression process. In some embodiments, the image decompression process includes a plurality of image decompression steps comprising (i) decomposing a bit string of a compressed image file by a decomposing module, (ii) reproducing an original media file by a decoder module passing the decomposed bit string through a decoder neural network, (iii) saving the reproduced media file as an image file in a particular image format by way of a particular image container algorithm associated with the particular image format, and (iv) making the image file available for use in the particular image format.

In some embodiments, the machine learning-based media compression and decompression system and process compress single-band, multiple-band, and hyperspectral imagery and other media files in ways that result in reduced file sizes in comparison with existing legacy compression systems, thereby enhancing communications systems where there is a greater need for real-time or near real-time transmission, such as mission critical applications in national security, aerospace and natural resources. In some embodiments, the machine learning-based media compression and decompression system and process use artificial intelligence (AI) to compress/decompress image media files (whether single-band, multiple-band, or hyperspectral imagery), thereby decreasing the amount of storage needed to persist the compressed files and the amount of available bandwidth needed to transmit the compressed files. As a result, web page and other online resource load times are accelerated. In some embodiments, the machine learning-based media compression and decompression system and process also reproduces compressed files in conventional formats (or containers) so that the receiver has the ability to view the file without additional software requirements. For example, one common type of container file is JPEG, which is an image format supported by the vast majority of web browsers and computing devices, and the machine learning-based media compression and decompression system and process are able to decode to such JPEG files and display the contents of the decoded JPEG files without any additional steps. In some embodiments, the machine learning-based media compression and decompression system and process is able to compress images of arbitrary bit-depths, such as 8-bit or 16-bit per pixel per channel. Thus, the machine learning-based media compression and decompression system and process is generally able to be used in a variety of applications including hyperspectral imagery. In some embodiments, the machine learning-based media compression and decompression system and process treat each image media file as a unique file. By treating each image media file as a unique file, the machine learning-based media compression and decompression system and process automatically tailor the compression algorithm based on the learned parameters (artificial intelligence/deep neural network/machine learning based learned parameters) to every single file being compressed, so that the compression factor for each individual file is maximized. In some embodiments, the machine learning-based media compression and decompression system and process is executed (in parallel) on GPU hardware, utilizing the parallel computations it supports, thereby offering immense computational speedups.

As stated above, new media types such as ultra-high resolution audio, video, single or multiple-band images, and hyperspectral imagery are significantly increasing the need for available bandwidth for transmission and computer data storage. Single-band, multiple-band or hyperspectral imagery (from now on referred to as image, or imagery) is no exception. Average image resolution of color images for example have been steadily increasing over time, and now resolutions up to 8K (7680×4320) pixels are commonplace. Adding to this, the available global internet bandwidth (the free capacity of the total internet bandwidth, whether through public or private networks, at any given time) is not increasing at the same rate as the above mentioned media content being produced. Therefore, efficient compression algorithms are needed to effectively compress these media files for transmission and data storage. Even if the available bandwidth capacity may handle the transmission of the above mentioned types of media, having larger file sizes significantly slows down the transmission process, thereby increasing the transmission times and the overall downstream processes associated with consuming them.

Embodiments of the machine learning-based media compression and decompression system and process described in this specification solve such problems by a novel machine learning approach and creation of a new image compression scheme, which achieves comparable or superior compression rates to existing methods such as JPEG. Machine learning is an advantageous approach because the machine learning algorithms involve parameterized functions that "learn" the underlying mathematical function using training data. These algorithms use sets of data to optimally tune their parameters such that once tuned, they can be used to carry out tasks such as object detection and classification in images, and speech recognition (e.g., for audio media files).

Embodiments of the machine learning-based media compression and decompression system and process are also ready for parallel execution in Graphical Processing Units (GPU) and Tensor Processing Units (TPU) hardware, thereby offering immense computational speed increases for compression. In some embodiments, the machine learning-based media compression and decompression process includes is geared for edge-computation devices such as mobile phones, edge-TPUs, and System-on-Chip (SoC) devices. In some embodiments, deployment and operation of the compression method is preferred on an edge-computation device for enhanced performance, as opposed to an architecture where most computation is carried out on a centralized server. In some embodiments, when applied to an image, the machine learning-based media compression and decompression system and process maintains the visual quality of the image at a very high fidelity, achieving scores of over 0.99 measured by the Multi-Scale Structural Similarity Index (MS-SSIM) for bit rates below 1 bit-per-pixel.

Embodiments of the machine learning-based media compression and decompression system and process described in this specification differ from and improve upon currently existing options. In particular, some embodiments differ by utilizing Machine Learning and deep neural networks to create a new image compression scheme, which achieves comparable or superior compression rates to existing methods, such as JPEG. Furthermore, the machine learning-based media compression and decompression system and process is also ready for executing in Graphical Processing Units (GPU) and Tensor Processing Units (TPU) hardware, thereby offering immense computational speedups for compression.

In addition, some embodiments of the machine learning-based media compression and decompression system and process improve upon the currently existing conventional compression schemes which use hard coded formulas. In contrast, the machine learning-based media compression and decompression system and process treat every image as different. Since the machine learning-based media compression and decompression system and process treat every image as different, the overall compression formula is able to adapt to particulars of every image. The result is a reduction in compressed file size, and this reduced file size accelerates communications and reduces the transmission time. Among general benefits and enhancements to any file transmission scenario, the resulting smaller sized compressed files enhances communications systems where there is a greater need for on or near real-time transmission, such as mission critical applications in national security, aerospace and natural resources.

The machine learning-based media compression and decompression system and process of some embodiments is the first of its kind to use Machine Learning to accelerate communications. As noted above, the benefits do not end with compression, but also exist in the decompression functionality of the machine learning-based media compression and decompression system and process. Specifically, the machine learning-based media compression and decompression system and process decompresses compressed media/image files in conventional formats, or containers (such as JPEG), so that the receiving user has the ability to view the file without additional software requirements. Another advantage is found in the ability of the machine learning-based media compression and decompression system and process to compress images of arbitrary bit-depths, such as 8-bit or 16-bit per pixel per channel. This generalizes its ability to be used in a variety of applications including hyperspectral imagery.

The machine learning-based media compression and decompression system and process of the present disclosure may be comprised of the following elements. This list of possible constituent elements is intended to be exemplary only and it is not intended that this list be used to limit the machine learning-based media compression and decompression system and process of the present application to just these elements. Persons having ordinary skill in the art relevant to the present disclosure may understand there to be equivalent elements that may be substituted within the present disclosure without changing the essential function or operation of the machine learning-based media compression and decompression system and process.

1. Single or multiple files in computer storage
2. Interface to the Compression Process. For example, but not limited to: an SDK or API
3. Preprocess the file(s)
4. Encoder neural network
5. Entropy coding module
6. Bit string
7. Computer network
8. Interface to the Decompression Process. For example, but not limited to: an SDK or API
9. Decomposing module
10. Decoder neural network
11. Container algorithm
12. Decompressed file
13. Add file(s) to computer storage
14. Serving the file(s) through a computer network By way of example, FIG. 1 conceptually illustrates an image compression process 100 of a machine learning-based media compression and decompression process for reducing time of transmission of single-band, multiple-band, and hyperspectral imagery using machine learning based compression. As shown in this figure, the image compression process 100 starts at C1 with one or more media file(s) in computer storage (at 110). For example, a media file is added to computer storage for processing at C1. The media file may be image file. The image file may be a single-band image, multiple-band image, or hyperspectral image. Next, the image compression process 100 proceeds to C2 which involves an interface, such as an application programming interface (API) or a software development kit (SDK), one or both of which may be used to generate a user interface (UI) for passing or selecting the media file(s) to compress (at 120). At this point, for example, the original media file added to computer storage for processing is passed to the compression process by an application with the UI at C2.

Figure 1:
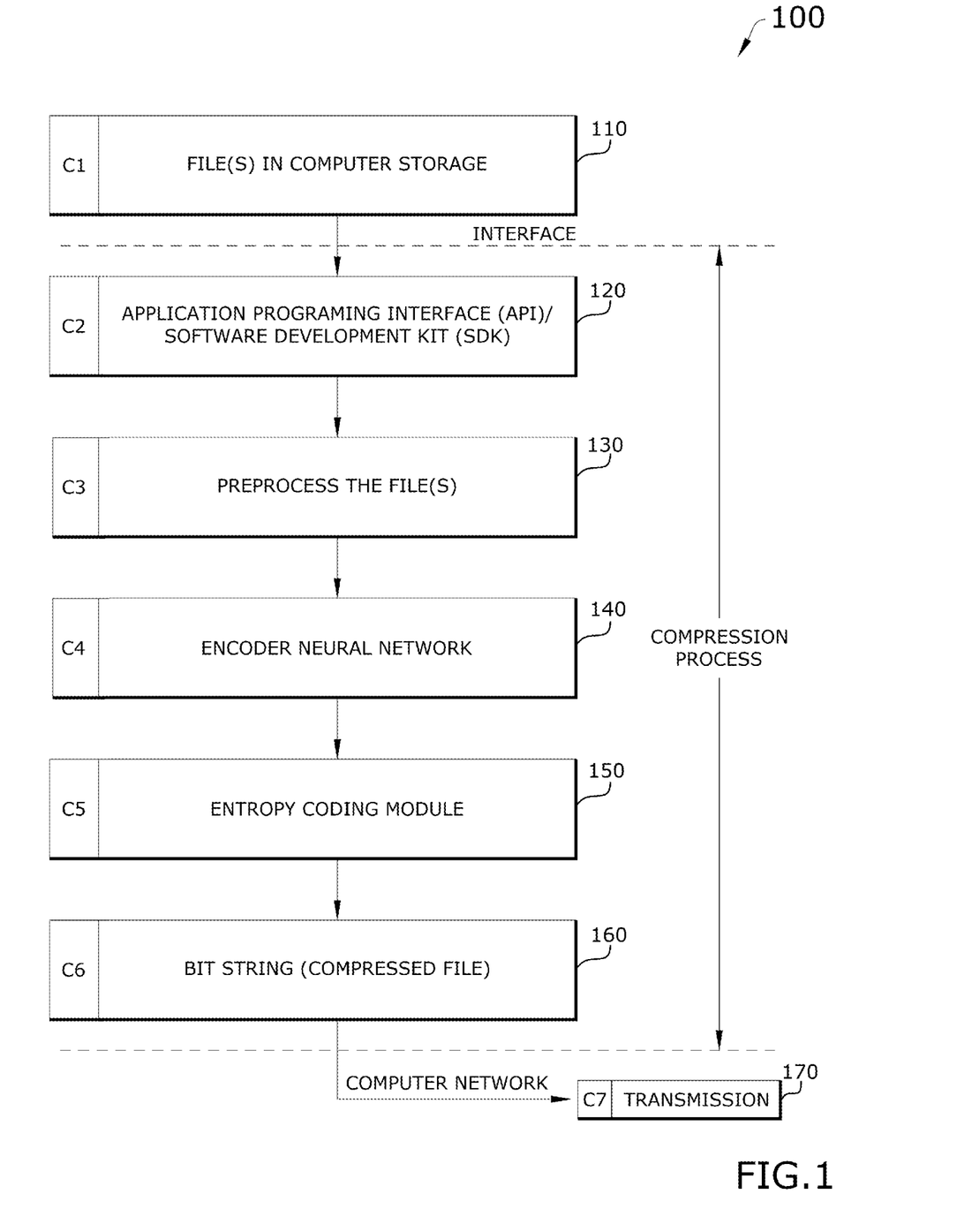
FIG. 1 conceptually illustrates an image compression process of a machine learning-based media compression and decompression process for reducing time of transmission of single-band, multiple-band, and hyperspectral imagery using machine learning based compression in some embodiments.
Figure 3:
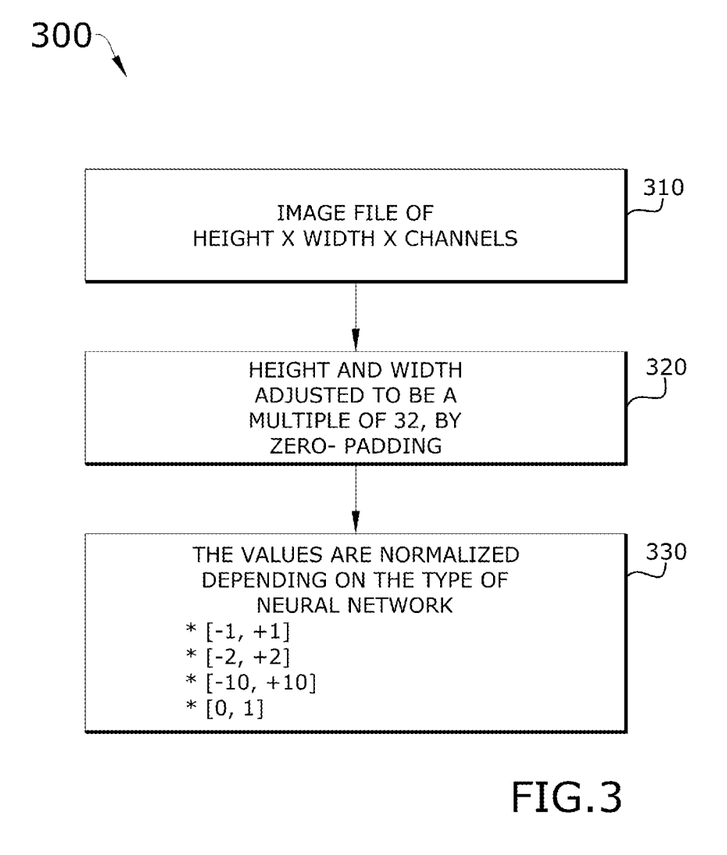
FIG. 3 conceptually illustrates a media file pre-processing method for normalizing dimensions of an image for neural network processing in some embodiments.

After passing or selecting the media file from computer storage, via the UI, the image compression process 100 continues to C3 to preprocess the media file (at 130). For example, once received, the compression process prepro­cesses the media file using a preprocessing module at C3. In some embodiments, the image compression process 100 proprocesses the media file or media files by a series of steps, which are described in greater detail below, by refer­ence to FIG. 3.

In some embodiments, the image compression process 100 proceeds to the next step C4 that involves machine learning-based encoding via an encoder neural network (at 140). For example, the encoder neural network of some embodiments is a trained deep neural network (DNN) that is able to reduce the spatial dimensionality of image in the media file. Next at C5, the entropy coding module (at 150) is used by the image compression process 100 to generate a bit string. For example, the output of the encoder module is passed through the entropy module at C5 to create the bit string, which is the compressed version of the original media file. The image compression process 100 then transitions to C6 to use the bit string as a compressed file (at 160), where the compressed file is a compressed version of the original media file.

In some embodiments, the compressed file is saved or stored. For example, the compressed file is returned to the main application with through the interface to compression process at C2 for further processing. For instance, the compressed file in some embodiments is transmitted (at 170) over a computer network to a destination for decompression. For example, a first compression of a media file results in the compressed media file being sent to a recipient who uses an image decompression process of the machine learning-based media compression and decompression process to decom­press the compressed media file to view the image. An example decompression process is described next.

Figure 2:
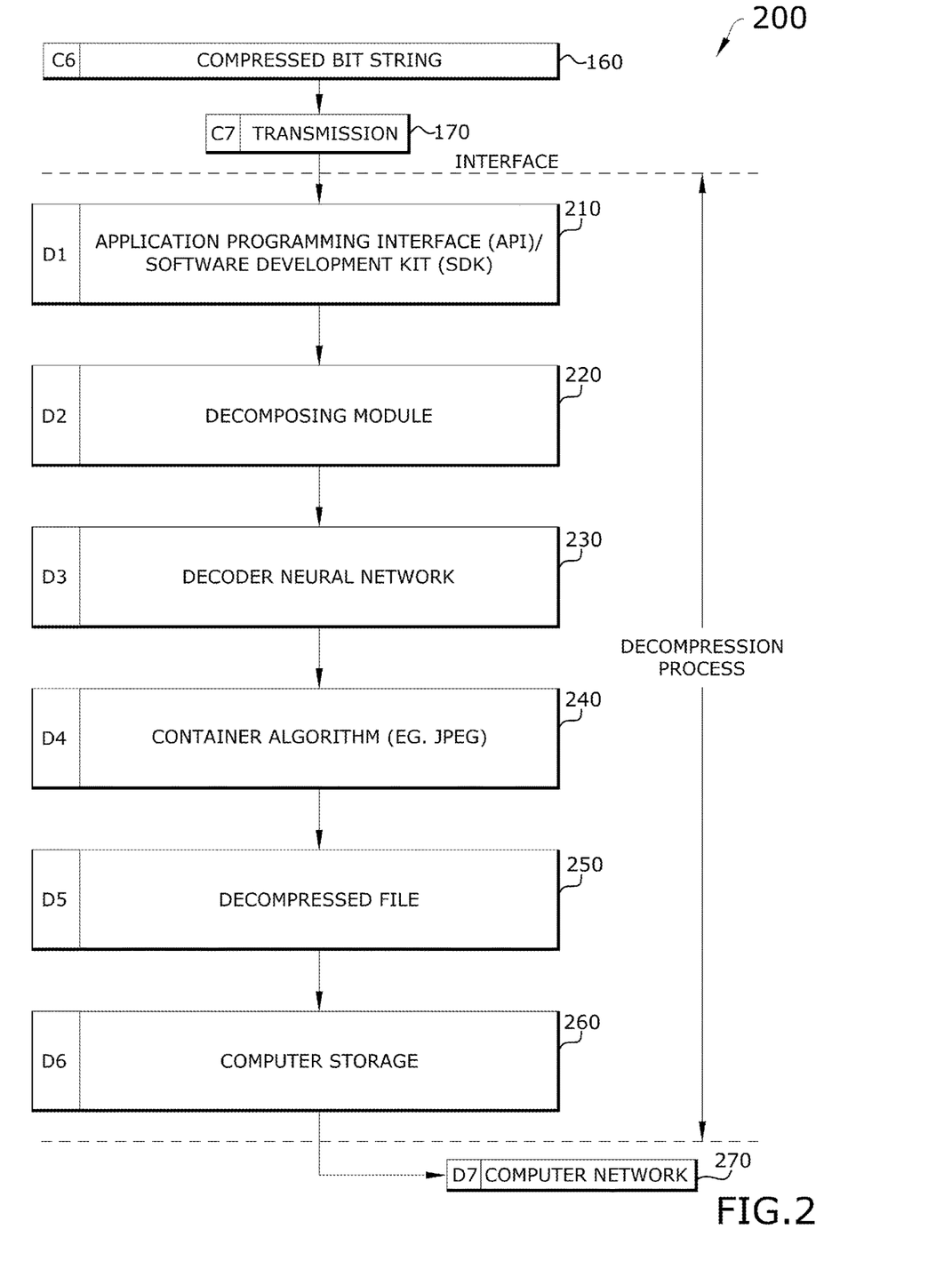
FIG. 2 conceptually illustrates an image decompression process of a machine learning-based media compression and decompression process for reducing time of transmission of single-band, multiple-band, and hyperspectral imagery using machine learning based decompression in some embodiments.

Turning to an example of decompression, FIG. 2 concep­tually illustrates an image decompression process 200 of the machine learning-based media compression and decompres­sion process for reducing time of transmission of single-band, multiple-band, and hyperspectral imagery using machine learning based decompression. In some embodi­ments, the image compression process 100 and the image decompression process 200 are parts of a single machine learning-based media compression and decompression pro­cess. For example, the image decompression process 200 may pick up after the last steps of the image compression process 100, described above by reference to FIG. 1. Thus, as shown in this figure, the compressed bit string (at 160) is transmitted (at 170) to a recipient, who receives the com­pressed bit string media file via user interface (UI) at D1. As before, the UI may be implemented by way of an API or SDK (at 210). The compressed file is the bit string com­pressed version of the original media file and this is passed to the decomposing module at D2 through the interface (such as SDK implemented user interface or API based user interface).

Next, the image decompression process 200 proceeds to D2 at which a decomposing module (at 220) is launched to decompose the bit string from the compressed (bit string) media file. Then the decomposed bit string is passed through the decoder neural network at D3. The decoder neural network is able to reproduce the original media file (before compression was applied). In some embodiments, the matrix of values after decomposing is processed at D3 by a decoder neural network (at 230). After the decoder neural network is completed, the image decompression process 200 continues forward to D4 at which step a container algorithm is used to save the reproduced file to a generally usable format. For example, the decompressed media file is saved for reading/ viewing/display in a format (as a type of file), such as an image file in a JPEG format, then a JPEG container algo­rithm is used to read (display and view) the resulting image. Next, the decompressed file at D5 is associated with the correct container (at 250) such that the image decompression process 200 is able to store the decompressed file at D6 in computer storage (at 260). The computer storage may be local or cloud-based storage. Then the image decompression process 200 transfers the decompressed file via computer network (at 270) to the appropriate storage.

As noted above, by reference FIG. 1, FIG. 3 conceptually illustrates a media file pre-processing method 300 for nor­malizing dimensions of an image for neural network pro­cessing. The media file pre-processing method 300 involves several media file preprocessing steps. For example, the media file pre-processing method 300 may proceed during the step 130 for preprocessing the media, described above in the image compression process 100 by reference to FIG. 1. As shown in this figure, the media file pre-processing method 300 starts by determining the height and width dimensions of the image file for each channel (at 310). For example, a multiple-band image by have two or more sets of dimensions for height and width. Next, the media file pre-processing method 300 adjusts the height and width of each channel of the image (at 320). The height and width are adjusted by the media file pre-processing method 300 to be multiples of thirty-two (32). In some embodiments, the media file pre-processing method 300 adjusts the height and width by a zero-padding process. In some embodiments, after adjusting the height and width of each channel of the image, the media file pre-processing method 300 normalizes the values (at 330) depending on the type of neural network being employed for the image compression. For example, normalized values may form a matrix of floating point values, such as [−1, +1], [−2, +2], [−10, +10], [0, 1], etc. Then the media file pre-processing method 300 ends and the image compression process 100 proceeds to step 140.

Figure 4:
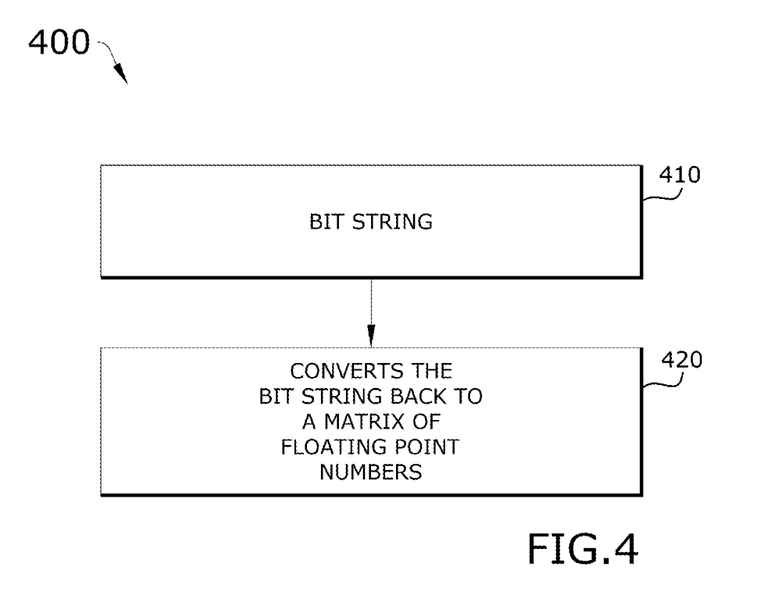
FIG. 4 conceptually illustrates a bit string decomposing method for converting a bit string to a matrix of normalized values in some embodiments.

As described above, by reference to FIG. 2, FIG. 4 conceptually illustrates a bit string decomposing method 400 for converting a bit string to a matrix of normalized values. In some embodiments, the bit string decomposing method 400 is performed by the decomposing module (at 220), described above by reference to the image decompression process 200 in FIG. 2. As shown in this figure, the bit string decomposing method 400 starts with the bit string (at 410), which is then converted (at 420) back to the matrix of floating point values. Then execution returns to step 230 of the image decompression process 200.

The machine learning-based media compression and decompression system and process of the present disclosure generally works by implementation as a software application or program which uses a Deep Neural Network (DNN) architecture (Encoder neural network) to create a reduced representation of the file (media file, image file, etc.). In images, for example, a single or multiple-channel image will get expanded to have any number ('z') of channels, but at a reduced height and width. To concretely illustrate this, for an RGB colour image of (height, width, z=3) dimensions would get reduced to (height/p, width/p, z) where p is a positive integer and z is an arbitrary, positive integer, typically of the size >50. This reduced floating point representation is then coded in to a bit string using an entropy coding module, to produce a compressed bit string. In this example, this bit string is one form of the compressed image, since it alone together with metadata saved as a header can be used to recover the original image. The bit string is then passed through the inverse process of entropy coding (Decomposing Module) to recreate the floating point representation (height/p, width/p, z) in the case of images. This recreated representation is passed through a second neural network (Decoder neural network) to recreate the original file.

The Encoder neural network and the Decoder neural network, together with the Entropy coding module, are jointly trained with Machine Learning techniques to minimize the error between the original input and the output of the Decoder neural network, so that the Decoder output (i.e. the reconstructed file) visually resembles the original input file. After this step, the software applies a standard container algorithm to save the reconstructed file to a container for general use. For example, JPEG would typically be used as the container when dealing with images with no transparency. Due to entropy coding, the recreated file has less entropy and variance, thereby allowing the saved container to be much smaller in file size than the original without compromising the visual quality. The file is then uploaded to a computer storage system, where data replication may happen across the globe, and made ready for serving through a public or a private Uniform Resource Locator (URL). If the file needs to be compressed, then the steps #1-#7 would be the process. If the file needs to be decompressed, then steps #8 to #14 would be the process.

To make the machine learning-based media compression and decompression system and process of the present disclosure, one may craft the main application software (or program, mobile app, or embedded software program, etc.) by following the steps outlined above. The software may include one or multiple implementations. For example, one implementation of a software application for compression (the image compression process), and a separate implementation of another application for decompression (the image decompression process). Alternatively, a single main application may implement the steps of the combined machine learning-based media compression and decompression process (which includes both the image compression process and the image decompression process).

The application or applications generally include machine readable instruction sets that carry out the operations of the algorithms for the machine learning-based media compression and decompression process, and encoded to have separate modules as noted above. Specifically, the compression module reduces the entropy and the variation of the input file, enabling a standard container algorithm to compress files to much smaller sizes without affecting their visual quality. Both the compression module and the decompression module are key modules that function to carry out operations required to make the compression/decompression work.

In order to make the compression module ready for use, a training period should be carried out during which the compression module is trained with machine learning techniques. One way to train the compression module via machine learning is to feed a series of files into the compression module to produce the compressed outputs. These outputs should then be compared to the originals, and the error between the two should be calculated and the encoder and decoder neural network weight matrices, with the entropy coding module parameters then being updated. Back-propagation (BP) used in standard machine learning training algorithms may then be applied in order to minimize this error between the input and output files.

To use the machine learning-based media compression and decompression system and process of the present disclosure, a user may download the file for processing, or uses an existing file on the computer to trigger the compression process through the compression interface. The compressed file is then retrieved through the same compression interface. To decompress the file, the user uses the decompression interface to send the compressed file and retrieve a fully decompressed version of the file. The user can also create the "Encoder" and "Decoder" neural networks and train with machine learning techniques to reproduce the original input file.

Additionally, the machine learning-based media compression and decompression system and process of the present disclosure can be used as a primary module for video compression. As a video is a sequence of frames, the individual frames can be treated as still images and use the methodology introduced here to compress the frame sequence, or a part of the frame sequence in full while compressing the residuals of the other frames.

Also, the machine learning-based media compression and decompression system and process of the present disclosure can be adapted for use in image compression software, video compression software, audio compression software, LiDAR compression software, spectral compression software, software for syncing global Content Distribution Networks (CDNs), and/or single or multi-array efficient storage disk solutions.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor, such as a graphical processing unit (GPU) and/or a tensor processing unit (TPU). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
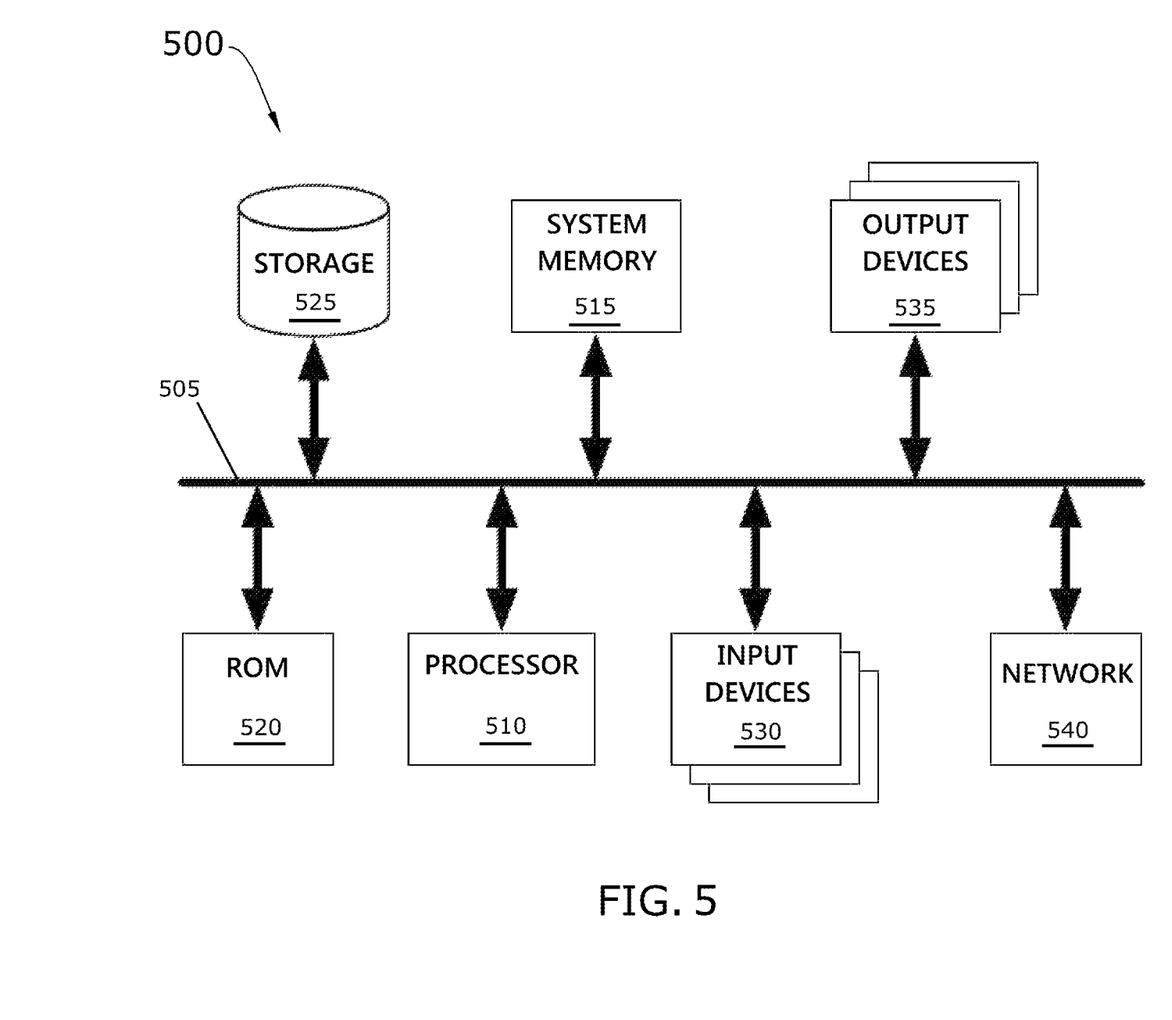
FIG. 5 conceptually illustrates an electronic system with which some embodiments of the invention are implemented.

FIG. 5 conceptually illustrates an electronic system 500 with which some embodiments of the invention are implemented. The electronic system 500 may be an edge device, such as a phone (cell phone, mobile phone, smartphone, etc.), a tablet computing device, a PDA (iPod, other handheld computing device, etc.), or any other sort of electronic device, mobile computing device, or other computing device. Such an electronic system includes various types of computer readable media and interfaces for various other types of computer readable media. Electronic system 500 includes a bus 505, processing unit(s) 510, a system memory 515, a read-only 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only 520, the system memory 515, and the permanent storage device 525.

From these various memory units, the processing unit(s) 510 retrieves instructions to execute and data to process in order to execute the processes of the invention. The processing unit(s) 510 described in this specification may include both central processing unit(s) (CPU) and graphical processing unit(s) (GPU), or tensor processing unit(s) (TPU). Also, the processing unit(s) 510 may be single processor(s) or multi-core processor(s) in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a floppy disk or a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only 520. For example, the various memory units include instructions for processing appearance alterations of displayable characters in accordance with some embodiments. From these various memory units, the processing unit(s) 510 retrieves instructions to execute and data to process in order to execute the compression and decompression processes.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display images generated by the electronic system 500. The output devices 535 include printers and display devices, such as cathode ray tubes (CRT) or liquid crystal displays (LCD). Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1 and 2 conceptually illustrate processes in which the specific operations of these processes may not be performed in the exact order shown and described. Specific operations may not be performed in one continuous series of operations, and different specific operations may be performed in different embodiments. Furthermore, the processes could be implemented using several sub-processes, or as part of a larger macro process. Thus, one of ordinary skill in the art would understand that the invention is not to be limited by the foregoing illustrative details, but rather is to be defined by the appended claims.

We claim:

1. A machine learning-based media compression and decompression process comprising:
    selecting an original media file with a multi-band image for compression, wherein the multi-band image comprises a plurality of channels of any data type and bit depth;
    determining, by a pre-processing module that is configured to pre-process the original media file with the multi-band image, spatial dimensionality of the multi-band image in the original media file for each channel in the plurality of channels, wherein spatial dimensionality of the multi-band image is based on dimensions of an image plane of the multi-band image in the original media file, wherein the dimensions of the image plane comprise a height dimension and a width dimension of the image plane for each channel in the plurality of channels of the multi-band image;
    adjusting, by the pre-processing module and for each channel in the plurality of channels, dimensions of the image plane of the multi-band image in the original media file;
    normalizing, by the pre-processing module and for each channel in the plurality of channels, the adjusted dimensions of the image plane of the multi-band image to a matrix of values;
    providing a pre-processed media file to an encoder module, wherein the pre-processed media file is based on the original media file with the multi-band image after adjusting and normalizing spatial dimensionality of the multi-based image;
    reducing, by the encoder module, spatial dimensionality of each channel in the plurality of channels of the multi-band image in the pre-processed media file, wherein the encoder module passes the pre-processed media file through an encoder neural network;
    outputting an encoded media file with a reduced spatial dimensionality image;
    creating a bit string, as a compressed version of the original media file, by passing the encoded media file with the reduced spatial dimensionality image through an entropy module;
    using the bit string created by the entropy module as a compressed media file that is configured for transmission over a data network and reproduction as the original media file, wherein a time of transmission of the compressed media file over the data network is reduced from the time of transmission of the original media file over the data network; and
    transferring, over the data network, the compressed media file to a destination, wherein the compressed media file is decompressed and configured for reproduction of the original media file at the destination.

2. The machine learning-based media compression and decompression process of claim 1, wherein selecting the original media file with the multi-band image for compression comprises selecting the original media file from a computer storage associated with an originating computing device connected to the data network.

3. The machine learning-based media compression and decompression process of claim 2, wherein the originating computing device comprises an edge computing device, wherein at least one of the pre-processing module, the encoder module, and the entropy module execute in a graphical processing unit (GPU) of the edge computing device.

4. The machine learning-based media compression and decompression process of claim 1, wherein the encoder neural network executes in a Tensor processing unit (TPU) of a computing device.

5. The machine learning-based media compression and decompression process of claim 1, wherein the matrix of values comprise at least one of integer values and floating point values.

6. The machine learning-based media compression and decompression process of claim 1, wherein adjusting dimensions of the image plane of the multi-band image in the original media file comprises:
    determining a height value measured in number of pixels of the height dimension and a width value measured in number of pixels of the width dimension of the image plane for each channel in the plurality of channels of the multi-band image;
    dividing, for each channel in the plurality of channels of the multi-band image, the height value and the width value by a positive integer value to obtain a resultant height value and a resultant width value for each channel in the plurality of channels of the multi-band image; and
    adjusting, for each channel in the plurality of channels of the multi-band image, each of the resultant height value and the resultant width value to a multiple of thirty-two.

7. The machine learning-based media compression and decompression process of claim 6, wherein the height dimension and the width dimension of the image plane for a first channel in the plurality of channels of the multi-band image are different from the height dimension and the width dimension of the image plane for a second channel in the plurality of channels of the multi-band image.

8. The machine learning-based media compression and decompression process of claim 6, wherein adjusting the resultant height value and the resultant width value to a multiple of thirty-two comprises zero-padding the resultant height value and the resultant width value to particular multiples of thirty-two.

9. The machine learning-based media compression and decompression process of claim 8, wherein a first multiple of thirty-two for the image plane of the first channel in the plurality of channels of the multi-band image is one of (i) different from a second multiple of thirty-two for the image plane of the second channel in the plurality of channels of the multi-band image and (ii) same as the second multiple of thirty-two for the image plane of the second channel in the plurality of channels of the multi-band image.

10. The machine learning-based media compression and decompression process of claim 1, wherein the destination comprises one of a destination storage location and a destination computing device connected to the data network.

11. The machine learning-based media compression and decompression process of claim 10, wherein transferring the compressed media file to the destination comprises transferring the compressed media file over the data network to the destination computing device for reproducing the original media file, wherein the machine learning-based media compression and decompression process further comprises:

receiving, at the destination computing device, the compressed media file transferred over the data network;

decomposing, by the destination computing device utilizing a decomposing module, the bit string of the compressed media file;

reproducing the original media file by a decoder module passing the decomposed bit string through a decoder neural network;

saving, by the destination computing device, the reproduced original media file as an image file in a particular image format by way of a particular image container algorithm associated with the particular image format; and making the image file available for use in the particular image format.

12. The machine learning-based media compression and decompression process of claim 11, wherein the destination computing device comprises an edge computing device, wherein at least one of the decomposing module and the decoder module execute in a graphical processing unit (GPU) of the edge computing device.

13. The machine learning-based media compression and decompression process of claim 11, wherein the decoder neural network executes in a Tensor processing unit (TPU) of a computing device.

* * * * *